United States Patent
Bücker et al.

(10) Patent No.: US 8,488,795 B2
(45) Date of Patent: Jul. 16, 2013

(54) METHOD FOR PROVIDING A SYMMETRIC KEY FOR PROTECTING A KEY MANAGEMENT PROTOCOL

(75) Inventors: Wolfgang Bücker, Neubiberg (DE); Günther Horn, München (DE); Srinath Thiruvengadam, Donauwörth (DE)

(73) Assignee: Siemens Aktiengesellschaft, Munich (DE)

( * ) Notice: Subject to any disclaimer, the term of this patent is extended or adjusted under 35 U.S.C. 154(b) by 284 days.

(21) Appl. No.: 12/311,358

(22) PCT Filed: Sep. 24, 2007

(86) PCT No.: PCT/EP2007/060069
§ 371 (c)(1),
(2), (4) Date: Mar. 27, 2009

(87) PCT Pub. No.: WO2008/037670
PCT Pub. Date: Apr. 3, 2008

(65) Prior Publication Data
US 2010/0034384 A1    Feb. 11, 2010

(30) Foreign Application Priority Data
Sep. 28, 2006  (DE) .................. 10 2006 046 017

(51) Int. Cl.
*H04L 29/06*    (2006.01)
(52) U.S. Cl.
USPC .............. 380/278; 380/44; 380/277; 380/281
(58) Field of Classification Search
USPC ............................................... 380/278
See application file for complete search history.

(56) References Cited

U.S. PATENT DOCUMENTS 5,720,034 A * 2/1998 Case ............................ 380/283
7,466,976 B2   12/2008 Kröselberg
(Continued)

FOREIGN PATENT DOCUMENTS

CN    1659821 A    8/2005
DE    102 38 928 A1    3/2004
(Continued)

OTHER PUBLICATIONS

Rosenberg et al. "SIP: Session Initiation Protocol", Jun. 2002, I.E.T.F. Network Working Group, RFC 3261. pp. 232-242.*

(Continued)

*Primary Examiner* — Jung Kim
*Assistant Examiner* — Adrian Stoica
(74) *Attorney, Agent, or Firm* — Staas & Halsey LLP

(57) ABSTRACT

Cryptographic material is generated for a protocol for the encrypted transmission of media data between a subscriber device and a provider device. A first symmetric key of the subscriber device and the provider device is inserted in a symmetric key protection mechanism of a network protocol of a control layer to establish a communication session between the subscriber device and the provider device. A first time-variable parameter is transmitted from the provider device to the subscriber device. A second symmetric key for protecting the key management protocol is calculated by both the provider device and the subscriber device using a defined function depending at least on the first symmetric key and the first time-variable parameter.

15 Claims, 6 Drawing Sheets

U.S. PATENT DOCUMENTS

| | | | |
|---|---|---|---|
| 2005/0044365 | A1 | 2/2005 | Haukka et al. |
| 2005/0063544 | A1 | 3/2005 | Uusitalo et al. |
| 2006/0062393 | A1 | 3/2006 | Hsu et al. |
| 2006/0171541 | A1 | 8/2006 | Horn et al. |
| 2006/0190726 | A1 | 8/2006 | Brique et al. |
| 2007/0121582 | A1 | 5/2007 | Fries |
| 2007/0140493 | A1 | 6/2007 | Kröselberg |

FOREIGN PATENT DOCUMENTS

| | | |
|---|---|---|
| DE | 103 55 418 A1 | 7/2005 |
| JP | 2002-290391 | 10/2002 |
| WO | 2004/075584 A1 | 9/2004 |
| WO | 2005/039141 A1 | 4/2005 |

OTHER PUBLICATIONS

Boman et al. "UMTS security", Oct. 2002, Electronics & Communication Engineering Journal.*

C. Kaufman, Ed., Internet Key Exchange (IKEv2) Protocol, Dec. 2005, I.E.T.F. Network Working Group, RFC 4306, pp. 7-11, 26-29, 33-34.*

J. Arkko, E. Carrara, F. Lindholm, M Naslund, K. Norrman, MIKEY: Multimedia Internet KEYing, Aug. 2004, I.E.T.F. Network Working Group, RFC 3830, pp. 1-4.*

David Geer, Building Converged Networks with IMS Technology. This paper appears in Computer, Issue Date: Nov. 2005, vol. 38, Issue 11, on pp. 14-16. ISSN: 0018-9162 INSPEC Accession No. 8654125 Digital Object Identifier: 10.1109/MC.2005.370.*

Muhammad Sher, Thomas Magedanz, Secure Service Provisioning Framework (SSPF) For IP Multimedia Systems and Next Generation Mobile Networks, published in 3rd International Workshop In Wireless Security Technologies Proceedings, Apr. 4-5, 2005, London. ISSN 1746-9058, pp. 108-109.*

3rd Generation Partnership Project; Technical Specification Group Core Network; Cx Interface based on the Diameter protocol; Protocol details; (Release 5); 3GPP TS 29.229 V. 1.0.0; Dec. 2001; pp. 1-30.

B. Abobe et al.; "Radius Authenticiation Client MIB"; Request for Comments RFC 2618; Jun. 1999; pp. 1-14.

M. Baugher et al.; "The Secure Real-Time Transport Protocol (SRTP)"; Request for Comments RFC 3711; Mar. 2004, pp. 1-56.

J. Arkko; "MIKEY: Multimedia Internet KEYing"; Request for Comments RFC 3830; Aug. 2004; pp. 1-66.

J. Rosenberg et al.; "SIP: Session Initiation Protocol"; Request for Comments RFC 3261; Jun. 2002; pp. 1-269.

"Telecommunications and Internet Converged Services and Protocols for Advanced Networking (TISPAN); IP Multimedia; Diameter based protocol for the interfaces between the Call Session control Function and the User Profile Server Function/Subscription Locator Function; Signalling flows and protocol details"; ETSI TS 183 033 V1.1.1, Apr. 2006; pp. 1-19.

"PacketCable™ IMS Delta Specifications; 3G Security; Access security for IP-based services Specification 3GPP TS 33.203"; PKT-SP-33.203-I01-0606406; 2006; pp. 1-58.

Open Mobile Alliance, "Push to Talk Over Cellular (PoC)—Architecture"; Candidate Version 1.0; Apr. 2005; pp. 1-156.

A. Menezes et al.; "Handbook of Applied Cryoptgraphy", CRC-Press, 1997, pp. 497-552.

German Communication dated Jul. 24, 2007.

German Communication dated Aug. 7, 2008.

International Search Report for PCT/EP2007/060069, mailed Mar. 3, 2008.

German translation of Chinese Office Action issued Mar. 9, 2011 in corresponding Chinese Patent Application 200780035953.X.

German Translation of Japanese Office Action mailed Nov. 8, 2011 issued in corresponding Japanese Patent Application No. 2009-529672.

3GPP TS 33.203 V 5.1.0, "3rd Generation Partnership Project; Technical Specification Group Services and System Aspects; 3G Security; Access security for IP-based services", Release Mar. 5, 2002, pp. 1-37 <http://www.3gpp.org/ftp/Specs/html-info/33203.htm>.

English Translation of Japanese Office Action mailed Jun. 21, 2012 issued in corresponding Japanese Patent Application No. 2009-529672.

* cited by examiner

METHOD FOR PROVIDING A SYMMETRIC KEY FOR PROTECTING A KEY MANAGEMENT PROTOCOL

CROSS REFERENCE TO RELATED APPLICATIONS

This application is the U.S. national stage of International Application No. PCT/EP2007/060069, filed 24 Sep. 2007 and claims the benefit thereof. The International Application claims the benefits of German Application No. 10 2006 046 017.0 filed on 28 Sep. 2006, both applications are incorporated by reference herein in their entirety.

BACKGROUND

Described below is a method for providing a symmetric key for protecting a key-management protocol.

The technical field of the method relates to the protection or encryption of media data between user equipment, such as a personal computer, and provider equipment, for example a media server of a service provider.

Typically no measures are taken to protect the media data in SIP/RIP-based Voice-over-IP systems currently in use (such as the IP Multimedia Subsystem—IMS for example). This might be justifiable in mobile radio networks, which typically provide a Layer-2 data encryption, such as the UMTS or GPRS network for example. Such underlying Layer-2 encryptions are typically not present in fixed network scenarios however, so that own protection mechanisms have to be used here. This is all the more urgent since for example the IMS will also be used to an increasing degree in fixed network scenarios and not just in the mobile network environment, for which it was originally developed.

A possible approach to protecting the media data is end-to-end encryption between the two communication partners. However a variety of problems are typically encountered here such as key management, lawful interception, transcoding etc. A better variant here appears to be an end-to-middle approach, in which protection is only undertaken between the terminal and provider equipment (e.g. a media proxy).

In an end-to-end protection scenario the signaling end points and the media protection end points are the same, in an end-to-middle scenario they are different. RFC 3711 defines a profile for RTP, namely Secure RTP (SRTP), to protect the RTP stream. SRTP can be used to protect the media traffic in an end-to-end connection, i.e. the complete path between two communicating partners. RTP is also able to be used for an end-to-middle connection.

SUMMARY

One aspect is to protect media data between user equipment and provider equipment in respect of integrity and confidentiality using a suitable security protocol such as SRTP.

However such a security protocol must be equipped with a suitable main key for derivation of session keys and cryptographic context. One example for a cryptographic context is described in section 3.2 of RFC 3711. Before the start of a communication between the user equipment and the provider equipment, such as a media proxy for example, the main key and the cryptographic context are not available in the user equipment and the provider equipment. It is thus necessary to provide the main key and the cryptographic context. A key-management protocol can be used for this purpose. An example of a key-management protocol for SRTP is MIKEY. MIKEY is described in RRC 3830. The key-management protocol is executed between the user equipment and the suitable server of the network. The suitable server does not have to be the media proxy. Alternately this can also coincide with the SIP proxy. However the key-management protocol itself must be protected.

Thus a further aspect is to protect a key-management protocol for a protocol for encrypted transmission of media data, such as SRTP, between user equipment and provider equipment.

A further aspect is to provide symmetric keys of user equipment and corresponding provider equipment for protecting a key-management protocol for a protocol for encrypted transmission of media data between the user equipment and the provider equipment.

Accordingly a method for providing a symmetric key for protecting a key-management protocol is proposed, by which cryptographic material is generated for a protocol for encrypted transmission of media data between user equipment and provider equipment, with the method having the following operations:

Provision of a first symmetric key of the user equipment and the provider equipment, which is used in a protection mechanism of a network protocol based on symmetric keys of a control layer for establishing a communication session between the user equipment and the provider equipment;

Provision of a first time-variable parameter by the provider equipment;

Transmission of the first time-variable parameter provided from the provider equipment to the user equipment;

Computation by the provider equipment of a second symmetric key for protection of the key-management protocol by a predefined function depending on at least the first symmetric key provided and on the first time-variable parameter provided; and Computation by the user equipment of the second symmetric key by the predefined function, depending on at least the first symmetric key provided and on the first time-variable parameter transmitted.

Furthermore a method is proposed for encryption of media data between user equipment and provider equipment, which features the following operations:

Provision of a symmetric key to the user equipment and the provider equipment respectively by the method explained above for providing a symmetric key for protecting a key-management protocol;

Encryption of the media data by the user equipment or the provider equipment depending on the symmetric key;

Sending the encrypted media data by the user equipment or the provider equipment;

Receipt of the encrypted media data by the provider equipment or the user equipment; and Encryption of the received media data by the provider equipment or the user equipment by the symmetric key provided.

Advantageously the method provides an opportunity of protecting the key-management protocol, by which cryptographic material is generated for a protocol such as SRTP for encrypted transmission of media data between user equipment and provider equipment. The protection of the key-management protocol is advantageously undertaken by an easy-to-handle symmetric encryption method with a symmetric key.

In accordance with an embodiment, the protocol for encrypted transmission of the media data is embodied as the Secure Real-Time Transport Protocol (SRTP).

In accordance with a further embodiment the key-management protocol is embodied as Multimedia Internet Keying (MIKEY).

In accordance with a further embodiment the protection mechanism is embodied as an authentication and/or integrity protocol, especially as the HTTP Digest protocol.

In accordance with a further embodiment the network protocol for establishing the communication connection is embodied as the Session Initiation Protocol (SIP).

In accordance with a further embodiment the cryptographic material has a main key for derivation of session keys and cryptographic context.

In accordance with a further embodiment the key-management protocol is used in the control layer and/or in a media layer.

A further development of the method explained above features the following:

Generation of a second time-variable parameter by the user equipment;

Transmission of the generated second time-variable parameter from the user equipment to the provider equipment;

Computation by the provider equipment of the second symmetric key depending on the first symmetric key provided, on the first time-variable parameter provided and on the second time-variable parameter transmitted by the user equipment; and Computation by the user equipment of the second symmetric key depending on the first symmetric key provided, on the first time-variable parameter transmitted by the provider equipment and on the generated second time-variable parameter.

In accordance with a further development, a third time-variable parameter is derived in each case by the user equipment and the provider equipment from the first time-variable parameter, depending on which the second symmetric key is computed by the user equipment and the provider equipment in each case.

In accordance with a further embodiment, the first time-variable parameter is embodied as a Number Used Once (Nonce) and/or the second time-variable parameter as a Client-Defined Nonce (CNonce) and/or the third time-variable parameter as a Nonce Count of the HTTP Digest protocol.

In accordance with a further embodiment the predefined function is able to be divided into a first subfunction and a second subfunction, with the first subfunction having at least the first symmetric key and the first time-variable parameter as its input parameters and the second subfunction having at least one result of the first subfunction and the two time-variable parameters as its input parameters.

In accordance with a further embodiment the user equipment and the provider equipment at least partly form an IP Multimedia Subsystem (IMS).

In accordance with a further embodiment the provider equipment of the IP Multimedia Subsystem (IMS) features:
 a proxy functionality unit which is coupled to the user equipment, and/or
 an interrogation functionality unit, which is coupled to the proxy functionality unit, and/or
 a server functionality unit, which is coupled to the interrogation functionality unit, and/or
 a home subscriber server unit, which is coupled to the server functionality unit and stores at least the first symmetrical key.

In accordance with a further embodiment the HTTP Digest protocol is executed between the user equipment and the server functionality unit.

In accordance with a further embodiment the HTTP Digest protocol is executed between the user equipment and the home subscriber server unit.

In accordance with a further embodiment the first subfunction of the server functionality unit is executed, the result of the first subfunction is transmitted from the server functionality unit to the proxy functionality unit, the second time-variable parameter is received by the proxy functionality unit and the second subfunction is executed by the proxy functionality unit.

In accordance with a further embodiment the first subfunction is executed by the home subscriber server unit, the result of the first subfunction is transmitted by the home subscriber server unit to the proxy functionality unit via the interrogation functionality unit, the second time-variable parameter is received by the proxy functionality unit and the second subfunction is executed by the proxy functionality unit.

In accordance with a further embodiment the user equipment has a SIP-based subscription with the provider equipment.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
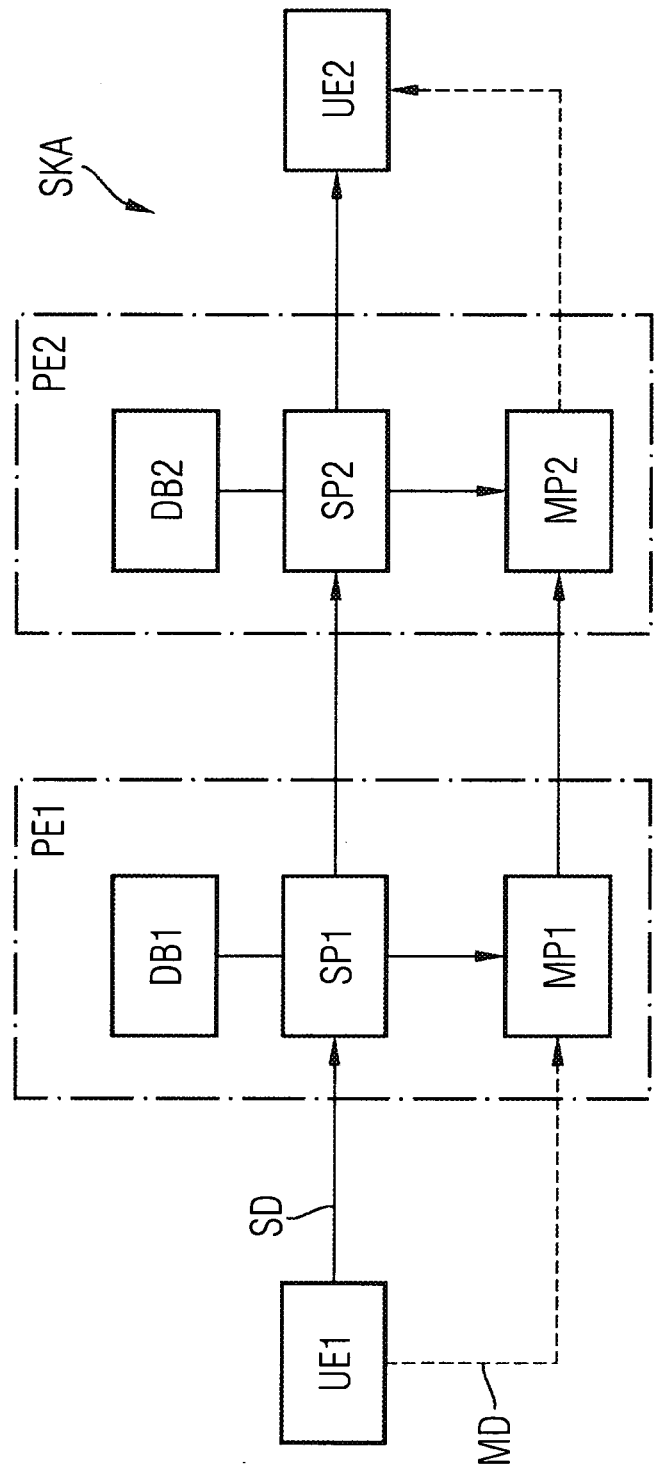
FIG. 1 a schematic block diagram of an SIP-based communication architecture to which the method can be applied.

Reference will now be made in detail to the exemplary embodiments which are illustrated in the accompanying drawings, wherein like reference numerals refer to like elements throughout.

In all figures identical elements or elements and units with the same functions have—unless otherwise indicated—been labeled with the same reference symbols.

FIG. 1 shows a schematic block diagram of an SIP-based communication architecture SKA, to which the method is able to be applied.

The SIP-based communication architecture SKA in accordance with FIG. 1 is embodied by first user equipment UE1, first provider equipment PE1, second provider equipment PE2 and second user equipment UE2. In this case the first user equipment UE1 is coupled to the first provider equipment PE1. The second user equipment UE2 is coupled to the second provider equipment PE2. The first provider equipment PE1 and the second provider equipment PE2 are also coupled. The coupling between the first provider equipment PE1 and the second provider equipment PE2 can be embodied by a network, especially the Internet.

Provider equipment PE1, PE2 has a database DB1, DB2, an SIP proxy functionality unit SP1, SP2 and a media proxy functionality unit MP1, MP2.

The Session Initiation Protocol SIP is especially executed between the user equipment UE1 and the SIP functionality unit SP1. For reasons of clarity a corresponding diagram for the second user equipment UE2 and the second provider equipment PE2 is not shown.

The Secure Real-Time Protocol SRTP is executed between the first user equipment UE1 and the media proxy functionality unit MP1.

Figure 2:
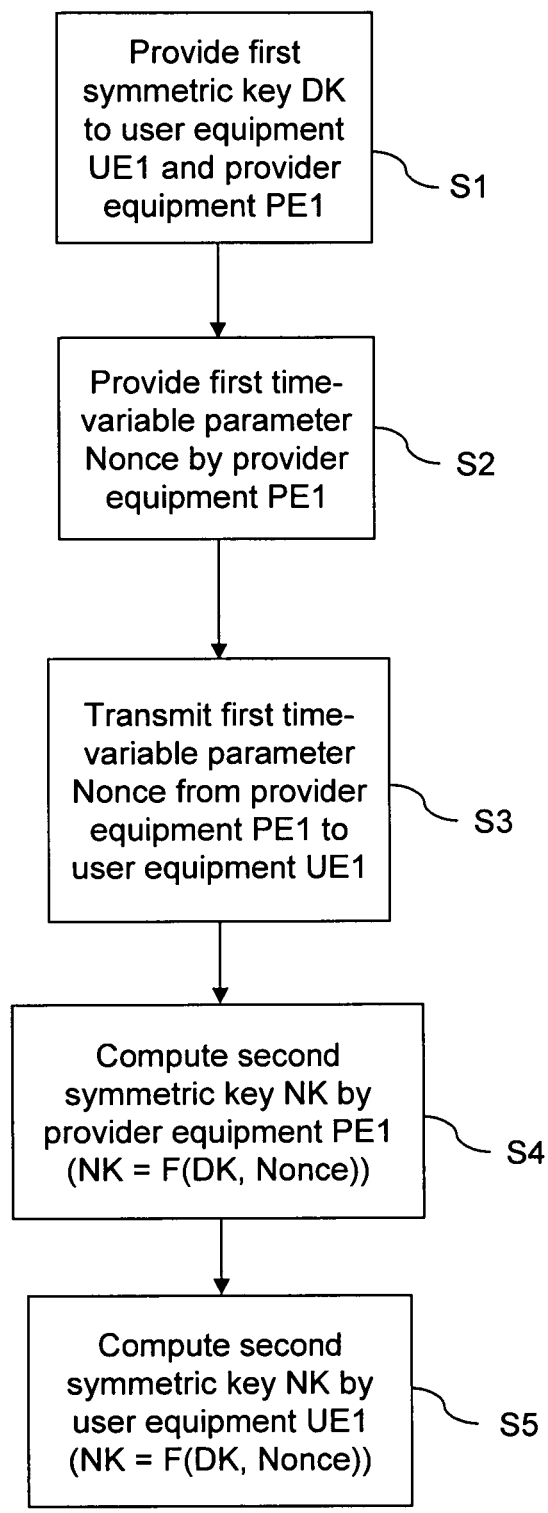
FIG. 2 a schematic flowchart of a first exemplary embodiment of the method.

FIG. 2 shows a schematic flowchart of a first exemplary embodiment of the method for providing a symmetric key NK for protecting a key-management protocol, with which cryptographic material is generated for a protocol for encrypted transmission of media data MD between the user equipment UE1 and the provider equipment PE1. The method is described below with reference to the block diagram of FIG. 2 referring to the architecture in accordance with FIG. 1. The first exemplary embodiment of the method in accordance with FIG. 2 has the following operations S1 through S5:

Operation S1:
A first symmetric key DK is provided to the user equipment UE1 and the provider equipment PE1. A first symmetric key DK is used in a security mechanism based on symmetric keys of a network protocol of a control layer for establishing a communication session between the user equipment UE1 and the provider equipment PE1.

Operation S2:
A first time-variable parameter Nonce is provided by the provider equipment PE1.

Operation S3:
The first time-variable parameter Nonce provided is transmitted from the provider equipment PE1 to the user equipment UE1.

Operation S4:
A second symmetric key NK is computed by the provider equipment PE1 (NK=F(DK, Nonce)) for the protection of the key-management protocol by a predefined function F depending on at least the first symmetric key DK provided and the first time-variable parameter Nonce provided.

Operation S5:
The second symmetric key NK is computed by the user equipment UE1 (NK=F(DK, Nonce)) by the predefined function F, depending on at least the first symmetric key; DK provided and on the transmitted first time-variable parameter.

The operations S4 and S5 can also be executed in the reverse sequence. The provider equipment PE1 may only compute the key NK once the user equipment UE1 is authenticated This means that the symmetric key NK is known to both the provider equipment PE1 and also the user equipment UE1.

Figure 3:
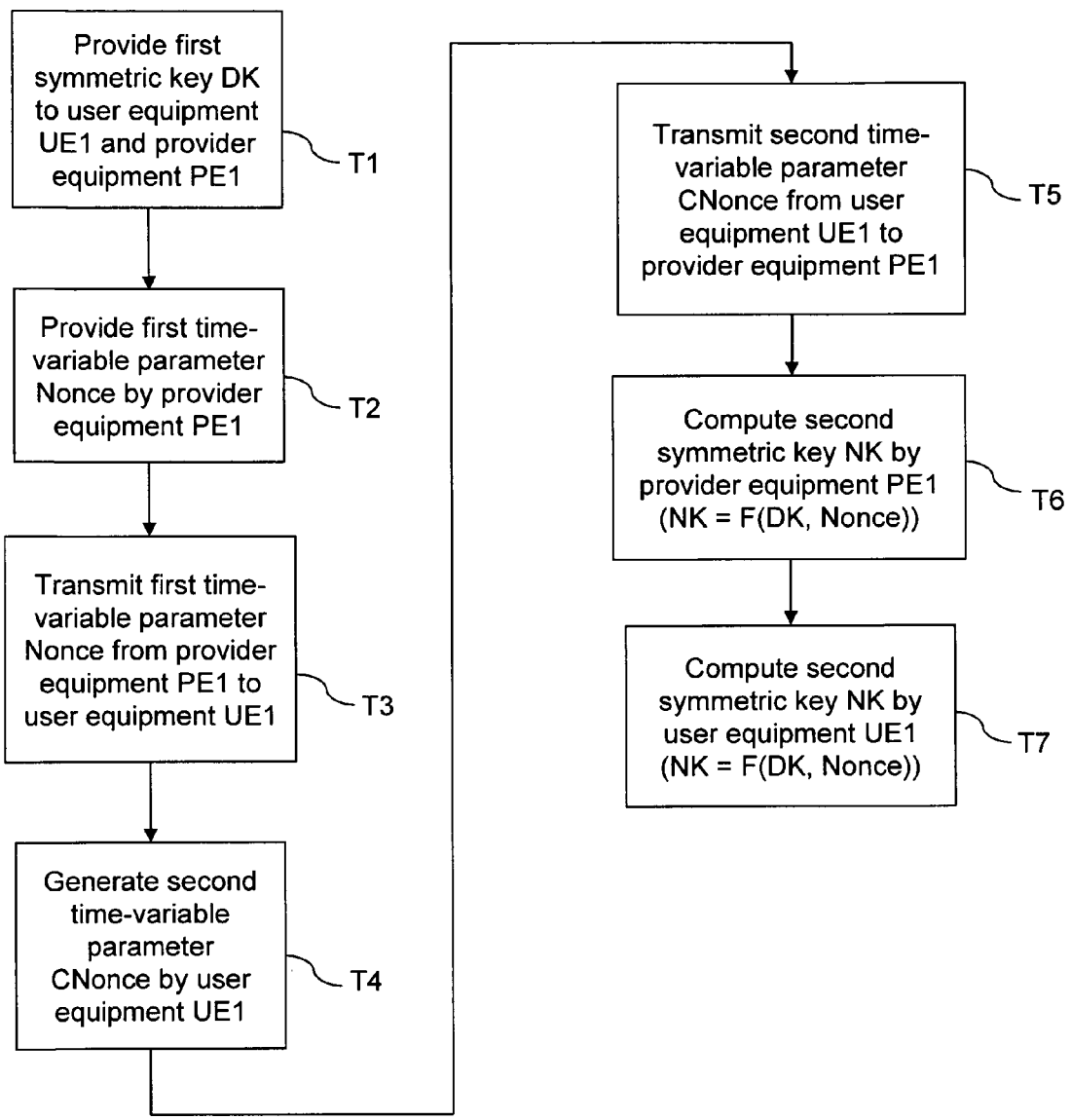
FIG. 3 a schematic flowchart of a second exemplary embodiment of the method.

A second exemplary embodiment of the method is shown in FIG. 3. The second exemplary embodiment in accordance with FIG. 3 has the operations T1 through T7. In this case the operations T1 through T3 in accordance with FIG. 3 correspond to the operations S1 to S3 in accordance with FIG. 2. For reasons of clarity a new diagram is dispensed with. The second exemplary embodiment in accordance with FIG. 3 thus has operations T1 to T3, which correspond to the operations S1 to S3 in accordance with FIG. 2, and the following operations T4 through T7:

Operation T4:
A second time-variable parameter CNonce is generated by the user equipment UE1.

Operation T5:
The generated second time-variable parameter CNonce is transmitted by the user equipment UE1 to the provider equipment PE1.

Operation T6:
The second symmetric key NK is computed by the provider equipment PE1 (NK=F(DK, Nonce, CNonce)) depending on the first symmetric key DK provided, on the first time-variable parameter Nonce provided and on the second time-variable parameter CNonce transmitted by the user equipment UE1.

Operation T7:
The second symmetric key NK is computed by the user equipment UE1 (NK=F(DK, Nonce, CNonce)) depending on the first symmetric key DK provided, on the first time-variable parameter Nonce transmitted by the provider equipment PE1 and on the second time-variable parameter CNonce generated.

The operations T6 and T7 can also be executed in the reverse sequence. The provider equipment PE1 may only compute the key NK once the user equipment UE1 is authenticated.

With reference to FIGS. 2 and 3, the following embodiments are advantageously possible.

The protocol for encrypted transmission of the media data MD can be embodied as the Secure Real Time Transport Protocol (SRTP). The key-management protocol can be embodied as Multimedia Internet Keying (MIKEY). The security mechanism can be an authentication and/or integration protocol, especially an HTTP Digest protocol. The network protocol for establishing the communication link can be the Session Initiation Protocol (SIP). Furthermore the cryptographic material can feature a main key for derivation of session keys and cryptographic context.

The key-management protocol may be used in the control layer and/or in a media layer. In particular a third time-variable parameter Nonce Count can be derived in each case by the user equipment UE1 and the provider equipment PE1 from the first time-variable parameter Nonce. Depending on this third time-variable parameter Nonce Count the second symmetric key NK can be computed in each case by the user equipment UE1 and the provider equipment PE1. In particular the HTTP Digest Authentication, which may be used as the security mechanism, is described in RFC 2618 and RFC 3261. The first time-variable parameter may be embodied as a Number Used Once (Nonce). The second time-variable parameter is especially a Client-Defined Nonce (CNonce). The third time-variable parameter may be embodied as Nonce Count of the HTTP Digest protocol.

Figure 4:
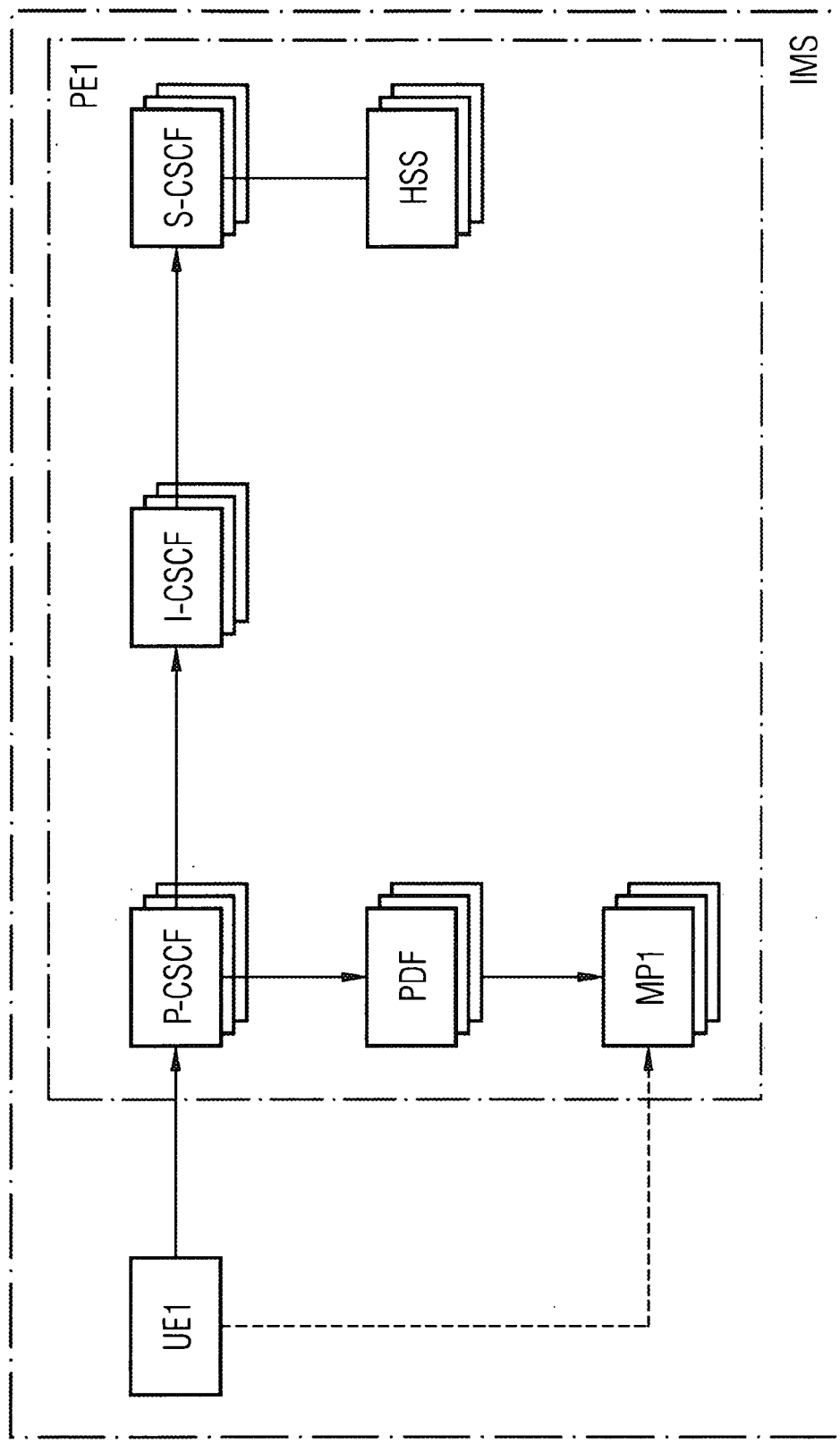
FIG. 4 a schematic block diagram of an IMS architecture to which the method can be applied.

The use of the method in an IMS architecture is explained below. To this end a schematic block diagram of such an IMS architecture is shown in FIG. 4. The HTTP Digest protocol is used in this case as the security mechanism for the Session Initiation Protocol SIP. Examples for HTTP Digest as authentication mechanism can be found in Push-To-Talk-over-Cellular (PoC) [OMA PoC Release 1] or in ETSI TISPAN Specification ETSI TS 183033. A further example of the use of HTTP Digest for a IMS architecture is the Packet Cable Specification PKT-SP-33.203.

The provider equipment PE1 of the IP Multimedia Subsystem IMS in accordance with FIG. 4 has a proxy functionality unit P-CSCF, an interrogation functionality unit I-CSCF, a server functionality unit S-CSCF and a Home Subscriber Server unit HSS. The proxy functionality unit P-CSCF is coupled to the user equipment UE1. The interrogation functionality unit I-CSCF is coupled to the proxy functionality unit P-CSCF, the server functionality unit S-CSCF is coupled to the interrogation functionality unit I-CSCF and the Home Subscriber Server unit HSS is coupled to the server functionality unit S-CSCF. In addition the Home Subscriber Server unit may store the first symmetric key DK.

Thus if HTTP Digest is used in the IMS architecture IMS, the user equipment UE1 and the Home Subscriber Server unit HSS respectively are equipped with the symmetric key DK for authentication through the HTTP Digest. During a session initiation the user equipment UE1 sends a first unauthorized SIP Register message to the P-CSCF, which forwards this to the S-CSCF. The S-CSCF requests a user identification or subscription data from the HSS. In this case two alternatives are possible:

Alternative 1:

The S-CSCF receives the key DK from the HSS. The S-CSCF stores the key DK for authentication of the user equipment UE1 by the next Register message. The S-CSCF terminates the HTTP Digest protocol.

Alternative 2:

The HSS does not send the key DK to the S-CSCF. The HSS terminates the HTTP Digest protocol itself and computes all messages necessary for the protocol used.

The following two examples show two different embodiments for the two alternatives explained above:

Example 1

Use of Nonce without CNonce

For Alternative 1:

The S-CSCF generates the second key NK using the first key DK and the first time-variable parameter Nonce and sends the second key NK, in the SIP 401 Unauthorized message, to the P-CSCF. After it has received this message, the user equipment UE1 likewise generates the second key NK in a similar manner using the first key DK and the time-variable parameter Nonce. However the P-CSCF has removed the key NK from the message, else it would be easily able to be overheard on the way from the P-CSCF to the user equipment UE1. Thus the second key NK is known to the user equipment UE1 and the P-CSCF.

For Alternative 2:

The HSS generates the second key NK using the first key DK and the first time-variable parameter Nonce by the predefined function F and sends the generated second key NK, in an IMS message to the S-CSCF, which forwards the second key NK, in an SIP 401 Unauthorized message, to the P-CSCF. The user equipment UE1 will likewise, after it has received this message, generate the second key NK in the same manner using the Nonce and the first key DK. However the P-CSCF has removed the key NK from the message, else it would be easily able to be overheard on the way from the P-CSCF to the user equipment UE1. Thus the first user equipment UE1 and the P-CSCF are provided with the second key NK.

Example 2

Use of Nonce and CNonce

For Alternative 1:

The S-CSCF generates NK using DK, Nonce and CNonce as input parameters for the predefined function F. But NK cannot be sent in the 401 message from the S-CSCF to the P-CSCF since CNonce is not available at this point in time in the S-CSCF. However it is possible to transmit NK in the SIP 200 message (see message 9 in FIG. 5). The user equipment UE1 can likewise generate NK by the predefined function F using DK, Nonce and CNonce. However the P-CSCF has removed the key NK from the message, else it would be easily able to be overheard on the way from the P-CSCF to the user equipment UE1. Thus the user equipment UE1 and the P-CSCF possess the second key NK.

The predefined function F can be divided up into a first subfunction F1 and a second subfunction F2. In this case the first subfunction F1 has at least the first symmetric key DK and the first time-variable parameter Nonce as input parameters and the second subfunction F2 has at least a result of the first subfunction F1(DK, Nonce) and the second time-variable parameter CNonce as input parameters. Then the result of the first subfunction (DK, Nonce) can be sent from the S-CSCF to the P-CSCF [in the 401 message] and the P-CSCF can compute NK depending on this and an intercepted CNonce. This is possible if the P-CSCF receives or intercepts the HTTP Digest headers.

For Alternative 2:

HSS executes the first subfunction F1 and computes its result F1(Nonce, DK) and sends the result F1 (Nonce, DK) in an IMS message to the S-CSCF. The S-CSCF can then forward the second key NK (NK=F2(CNonce, F1(Nonce, DK))) in the SIP 200 OK message to the P-CSCF. The user equipment UE1 can then likewise, after it has received this message, generate the second key NK using Nonce and DK. However the P-CSCF has removed the key NK from the message, else it would be easily able to be overheard on the way from the P-CSCF to the user equipment UE1. Thus both the user equipment UE1 as also the P-CSCF will possess the second key NK.

As one variant the result of the first subfunction F1(Nonce, DK) will be sent from the S-CSCF to the P-CSCF in the 401 message and the P-CSCF can compute the second key NK depending on this and the intercepted CNonce.

Figure 5:
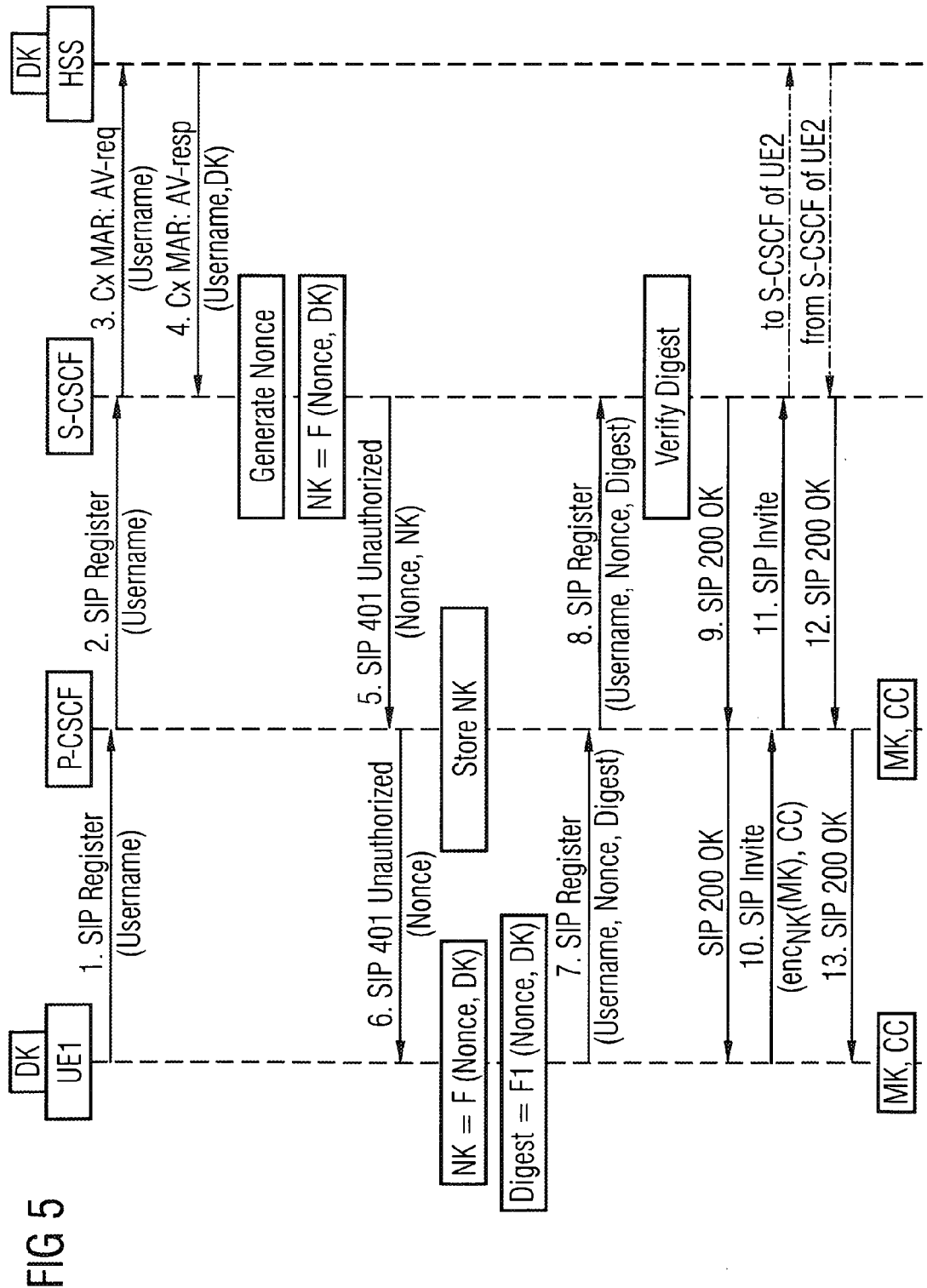
FIG. 5 a schematic flowchart of a third exemplary embodiment of the method, applied to the IMS architecture in accordance with FIG. 4.

To this end FIG. 5 shows a schematic flowchart of the method in accordance with Example 1 with Alternative 1

1. The user equipment UE1 sends the initial SIP Register request to the address if the P-CSCF, which is preconfigured in the IMS architecture IMS. The request contains an authorization header which features the Private User Identity IMPI.
2. The P-CSCF forwards the receiving message for S-CSCF via the I-CSCF. For reasons of clarity the I-CSCF is not shown in FIGS. 5 and 6.
3. After the SIP Register request has been received the S-CSCF transmits authentication data from the HSS by transmitting a Cx Multimedia Auth Request MAR with the IMPI. The reader is referred to 3GPP TS 29.229 for more details.
4. The HSS replies with a Multimedia Auth Answer MAA, which contains the first key DK for the HTTP Digest.
5. The S-CSCF generates the second key NK by the predefined function F using DK and Nonce as input parameters. The S-CSCF indicates to the P-CSCF via the I-CSCF by an SIP 401 Unauthorized message that the HTTP Digest authentication was requested. The SIP 401 Unauthorized message contains a WWW Authenticate header with the Nonce. In addition the second key NK is transported to the P-CSCF so that the key-management protocol can be executed.
6. The P-CSCF can store the second key NK and forwards the SIP 401 Unauthorized message to the user equipment UE1, however without the second key NK. The stored second key NK may not be used by the P-CSCF until the registration process has been successfully ended (NK can be used as from operation 9 in accordance with FIG. 5).

7. The user equipment UE1 computes the digest value Digest using the stored first key DK and the received Nonce. The user equipment UE1 sends a second SIP Register request to the P-CSCF, which contains an authorization header which features the IMPI and the calculated digest value Digest.
8. The P-CSCF forwards the received message via the I-CSCF to the S-CSCF.
9. After the S-CSCF has received this first message, it once again computes the digest value Digest using the stored key DK which it has previously received from the HSS as the digest key and the Nonce. The S-CSCF compares the computed digest value Digest with the digest value Digest received from the user equipment UE1. If the two values match, the registration is successfully ended by sending an SIP 200 OK message to the user equipment UE1. If the 200 message passes the P-CSCF, the P-CSCF can likewise assume a successful completion of the registration process and from there on can use the second key NK which it has stored in operation 6.
10. If for example the user equipment UE1 would like to have an encrypted session, it can transmit an encrypted main key enc(MK) in the SIP Invite message (see message 10 in accordance with FIG. 5) to the P-CSCF. The encryption of the main key MK into the encrypted main key enc(MK) is undertaken by the second symmetric key NK. One the second key NK is known to the P-CSCF this can then decrypt the received, encrypted main key enc(MK).
11. The initiation of the session is confirmed to the user equipment UE1 by returning the second SIP message.

As from operation 10 in FIG. 5 an initiation of the session is executed by the user equipment UE1. Alternatively the session can also be initiated by the provider equipment PE1, especially by the P-CSCF in such cases.

Figure 6:
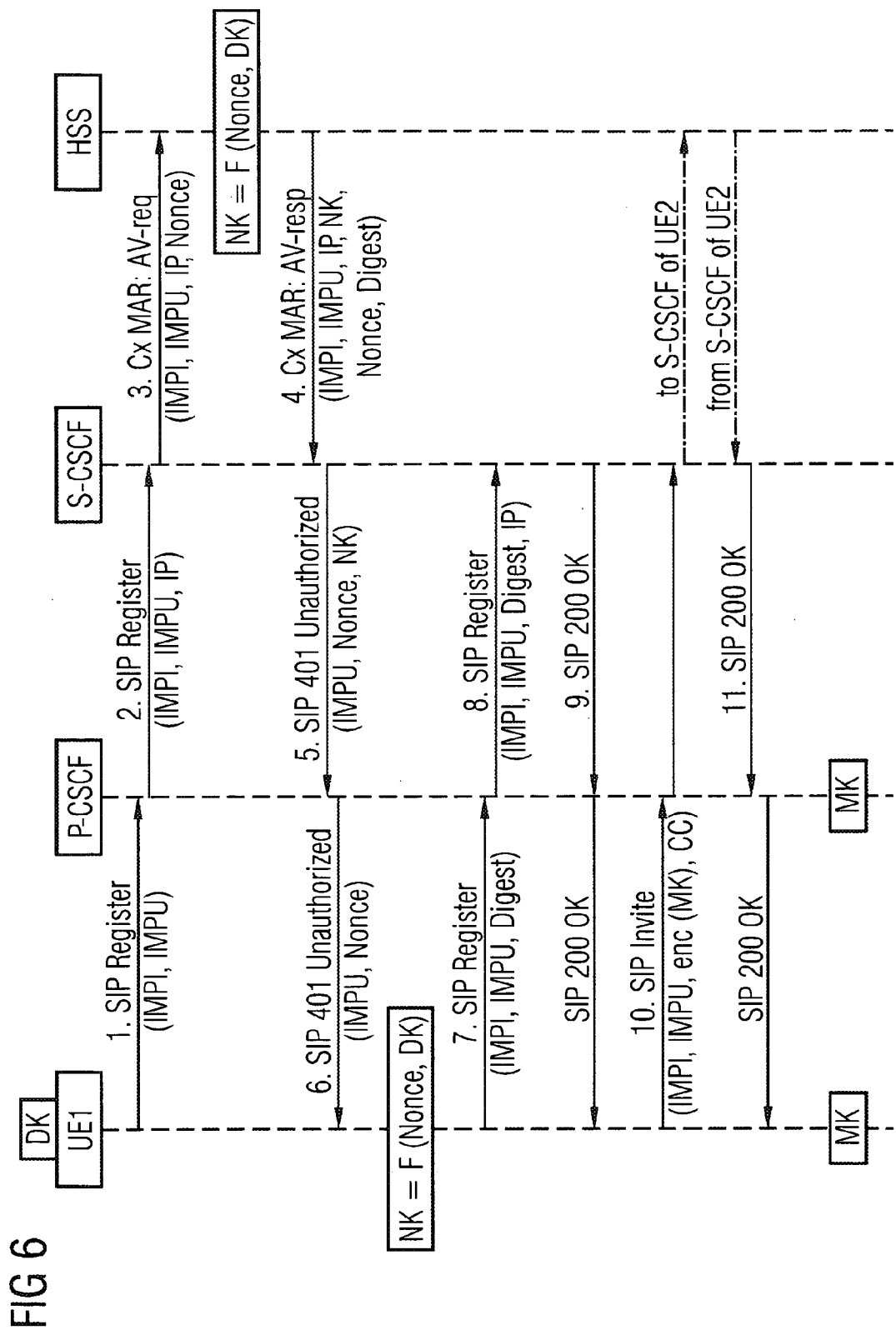
FIG. 6 a schematic flowchart of a fourth exemplary embodiment of the method, applied to the IMS architecture in accordance with FIG. 4.

FIG. 6 shows a schematic flowchart of the method for example 1 with alternative 2. The fourth exemplary embodiment in accordance with FIG. 6 differs from the third exemplary embodiment in accordance with FIG. 5 in operation 4. Operation 4 in FIG. 6 is different to operation 4 in FIG. 5 to the extent that the HSS in accordance with FIG. 6 only sends the second key NK and not the first key DK directly. In addition the expected digest value Digest is also sent to the S-CSCF.

Although the method has been described in the foregoing with reference to an exemplary embodiment, it is not restricted to these embodiments but can be modified in a plurality of ways. For example it is conceivable to only send the key NK in the 200 OK message from the S-CSCF to the P-CSCF. It is also conceivable to apply the method to a non-IMS architecture. In such a non-IMS architecture the SIP proxy can be equipped directly with the first symmetric key DK, so that receiving the first key DK from a database or a transfer of the second key NK from S-CSCF/HSS to P-CSCF is not necessary.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method to encrypt media data between user equipment and provider equipment, comprising:
   providing, to the user equipment and the provider equipment, a first symmetric key used in a protection mechanism of a network protocol of a control layer based on symmetric keys to establish a communication session between the user equipment and the provider equipment;
   providing a first time-variable parameter by the provider equipment;
   transmitting the first time-variable parameter from the provider equipment to the user equipment;
   computing, by the provider equipment, a second symmetric key for protection of the key-management protocol, using a predefined function depending on at least the first symmetric key and the first time-variable parameter; and
   computing, by the user equipment, the second symmetric key based on the predefined function depending on at least the first symmetric key and the first time-variable parameter transmitted from the provider equipment;
   encrypting, by the user equipment or provider equipment, the media data depending on the second symmetric key to produce encrypted media data;
   transmitting the encrypted media data without requiring establishing of said communication session;
   receiving the encrypted media data by the provider equipment or user equipment; and
   decrypting, by the provider equipment or the user equipment, the encrypted media data using the second symmetric key provided, and
   where a third time-variable parameter is respectively derived by the user equipment and the provider equipment from the first time-variable parameter depending on which the second symmetrical key is computed respectively by the user equipment and the provider equipment.

2. A method to provide a symmetric key for protecting a key management protocol and generating cryptographic material for a protocol for encrypted transmission of media data between user equipment and provider equipment, comprising:
   providing a first symmetric key to the user equipment and the provider equipment, which will be used in a protection mechanism of a network protocol of a control layer based on symmetric keys to establish a communication session between the user equipment and the provider equipment;
   providing of a first time-variable parameter by the provider equipment;
   transmitting the first time-variable parameter from the provider equipment to the user equipment;
   computing by the provider equipment of a second symmetric key for the protection of the key management protocol using a predefined function depending on at least the first symmetric key provided and on the first time-variable parameter provided;
   computing by the user equipment of the second symmetric key using the predefined function depending on at least the first symmetric key provided and the first time-variable parameter transmitted from the provider equipment; and deriving a third time-variable parameter respectively by the user equipment and the provider equipment from the first time-variable parameter depending on which the second symmetrical key is computed respectively by the user equipment and the provider equipment, where the media data is encrypted by one of the user equipment and provider equipment without requiring establishing of said communication session between the user equipment and the provider equipment.

3. The method as claimed in claim 2, wherein the protocol for encrypted transmission of the media data is embodied as the Secure Real-Time Transport Protocol,
the key management protocol is embodied as Multimedia Internet Keying,
the protection mechanism is embodied as an authentication and/or integrity protocol, especially as the HTTP Digest protocol,
the network protocol for establishing the communication link is embodied as the Session Initiation Protocol, and/or
the cryptographic material features a main key for derivation of session keys and cryptographic context.

4. The method as claimed in claim 2, wherein the key management protocol is used in the control layer and/or in a media layer.

5. The method as claimed in claim 2, comprising:
generating a second time-variable parameter by the user equipment;
transmitting the generated second time-variable parameter from the user equipment to the provider equipment;
computing by the provider equipment of the second symmetric key depending on the first symmetric key provided, the first time-variable parameter provided and the second time-variable parameter transmitted from the user equipment; and
computing by the user equipment of the second symmetric key depending on the first symmetric key provided, the first time-variable parameter transmitted by the provider equipment and on the second time-variable parameter generated.

6. The method as claimed in claim 2, wherein the first time-variable parameter is embodied as a Number-Used-Once and/or the second time-variable parameter as a Client-Defined-Nonce and/or the third time-variable parameter as a Nonce-Count of the HTTP-Digest protocol.

7. The method as claimed in claim 6, wherein the predefined function is able to be divided into a first subfunction and in a second subfunction, where the first subfunction has at least the first symmetric key and the first time-variable parameter as input parameters and the second subfunction has at least a result of the first subfunction and the second time-variable parameter as input parameters.

8. The method as claimed in claim 7, wherein one of the user equipment and the provider equipment embodies an IP Multimedia Subsystem.

9. The method as claimed in claim 8, wherein the provider equipment of the IP-Multimedia Subsystem comprises:
a proxy functionality unit, which is coupled to the user equipment,
an interrogation functionality unit, which is coupled to the proxy functionality unit,
a server functionality unit which is coupled to the interrogation functionality unit, and/or
a Home Subscriber Server unit which is coupled to the server functionality unit and stores at least the first symmetric key.

10. The method as claimed in claim 9, wherein the HTTP Digest protocol is executed between the user equipment and the server functionality unit.

11. The method as claimed in claim 9, wherein the HTTP Digest protocol is executed between the user equipment and the Home Subscriber Server unit.

12. The method as claimed in claim 10, wherein the first subfunction is executed by the server functionality unit, the result of the first subfunction is transmitted from the server functionality unit to the proxy functionality unit, the second time-variable parameter is received by the proxy functionality unit and the second subfunction is executed by the proxy functionality unit.

13. The method as claimed in claim 11, wherein the first subfunction is executed by the Home Subscriber Server unit, the result of the first subfunction is transmitted from the Home Subscriber Server unit to the proxy functionality unit, the second time-variable parameter is received by the proxy functionality unit and the second subfunction is executed by the proxy functionality unit.

14. The method as claimed in claim 2, wherein the user equipment has an SIP-based subscription with the provider equipment.

15. A method to encrypt media data between user equipment and provider equipment, comprising:
providing a first symmetric key to the user equipment and the provider equipment, which will be used in a protection mechanism of a network protocol of a control layer based on symmetric keys to establish a communication session between the user equipment and the provider equipment;
providing a first time-variable parameter by the provider equipment;
transmitting the first time-variable parameter provided from the provider equipment to the user equipment;
computing by the provider equipment of a second symmetric key for the protection of the key management protocol using a predefined function depending on at least the first symmetric key provided and on the first time-variable parameter provided; and
computing by the user equipment of the second symmetric key using the predefined function depending on at least the first symmetric key provided and the first time-variable parameter transmitted from the provider equipment;
encrypting by the user equipment or provider equipment of the media data depending on the second symmetric key provided;
transmitting the encrypted media data without requiring establishing of said communication session between the user equipment and the provider equipment;
receiving by the provider equipment or user equipment of the encrypted media data; and
decrypting by the provider equipment or by the user equipment of the received media data using the second symmetric key provided, and
where a third time-variable parameter is respectively derived by the user equipment and the provider equipment from the first time-variable parameter depending on which the second symmetrical key is computed respectively by the user equipment and the provider equipment.

* * * * *